US009732788B2

(12) United States Patent
Vankoughnett

(10) Patent No.: US 9,732,788 B2
(45) Date of Patent: Aug. 15, 2017

(54) RELEASABLE FLOATING DOCK HINGING LATCH

(71) Applicant: Ronald Earl Vankoughnett, Sparwood (CA)

(72) Inventor: Ronald Earl Vankoughnett, Sparwood (CA)

( * ) Notice: Subject to any disclaimer, the term of this patent is extended or adjusted under 35 U.S.C. 154(b) by 0 days.

(21) Appl. No.: 15/071,435

(22) Filed: Mar. 16, 2016

(65) Prior Publication Data

US 2016/0281770 A1   Sep. 29, 2016

Related U.S. Application Data

(60) Provisional application No. 62/137,272, filed on Mar. 24, 2015.

(51) Int. Cl.
*F16C 11/04*  (2006.01)
*B63C 1/02*  (2006.01)
*B63B 35/34*  (2006.01)
*E02B 3/06*  (2006.01)
*B63B 3/08*  (2006.01)

(52) U.S. Cl.
CPC .............. *F16C 11/04* (2013.01); *B63B 35/34* (2013.01); *B63C 1/02* (2013.01); *E02B 3/064* (2013.01); *B63B 3/08* (2013.01)

(58) Field of Classification Search
CPC . B63B 35/38; B63B 35/44; B63C 1/02; F16C 11/04
USPC .................................................. 114/264, 267
See application file for complete search history.

(56) References Cited

U.S. PATENT DOCUMENTS

2003/0140837 A1*   7/2003   O'Neil ...................... B63C 1/02
                                                                    114/259

* cited by examiner

*Primary Examiner* — Lars A Olson
(74) *Attorney, Agent, or Firm* — Maxey Law Offices, PLLC; Stephen Lewellyn

(57) ABSTRACT

A floating dock hinging latch releasably interconnects a pair of floating dock sections in an adjoined spaced relation for relative hinging motion. The floating dock hinging latch includes a pair of female latch portions secured to the side of one floating dock section and a pair of male latch portions secured to the side of the other floating dock section. The female latch portions and male latch portions are releasably engaged with one another to hingedly connect the floating dock sections by moving the floating dock sections toward one another across the surface of the water.

15 Claims, 11 Drawing Sheets

RELEASABLE FLOATING DOCK HINGING LATCH

CROSS-REFERENCE TO RELATED APPLICATIONS

This application claims the benefit of U.S. Provisional Patent Application Ser. No. 62/137,272, filed Mar. 24, 2015, the entirety of which is incorporated herein by reference.

FIELD OF THE INVENTION

The field of the invention relates to sectional floating docks, and more particularly, relating to a latch system for releasably connecting a pair of floating dock sections together.

BACKGROUND OF THE INVENTION

Floating docks are common and typically comprise a plurality of individually floating sections which sections are joined together to form a unitary structure and which may also be joined to a retaining wall or other structure for location and access purposes.

These sections will float but are often very heavy and extremely unwieldy whether in the form of a square or that of a substantially elongated rectangle.

Floating docks are subject to a wide variety of typical motions and stresses some of which are quite powerful yet with little motion while others are powerful and accompanied with large momenta. In many cases, floating dock sections do not float evenly even in calm water and are subject to substantial motion in all 3 directions.

This 3D motion is most difficult to handle when the sections are being installed or, alternatively, broken down for transport or storage during an off-season. Installation and removal are often conducted in inclement parts of the year when the likelihood of relative motion is very high and by individuals working alone or at best in a small group.

Over their lifetime such sections are likely to acquire a tilt in more than 1 direction making their installation and removal even more difficult.

SUMMARY OF THE INVENTION

It is an object of the present invention to provide a releasable hinging latch for secure and permanent engagement of floating dock sections.

It is a further object to provide for inter-engagement and latching of sections which are smooth and provide for reduced risk and error resulting with the engagement providing free hinging rotation about a single horizontal axis across the width of the dock sections.

In general, in one aspect, a floating dock hinging latch for releasably interconnecting a pair of floating dock sections in an adjoined spaced relation for relative hinging motion is provided. The floating dock hinging latch includes first and second female latch portions secured to a lateral side of a first dock section in a horizontally spaced relationship. Each of the first and second female latch portions have a channel that extends in a direction perpendicularly outwardly from the lateral side of the first dock section. First and second male latch portions are secured to a lateral side of a second dock section in a horizontally spaced relationship. Each of the first and second male latch portions have a horizontally oriented hinge pin extending generally parallel to the lateral side of the second dock section. The first female latch portion is hingedly engaged with the first male latch portion by the hinge pin of the first male latch portion extending through the channel of the first female latch portion. And the second female latch portion is hingedly engaged with the second male latch portion by the hinge pin of the second male latch portion extending through the channel of the second female latch portion.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
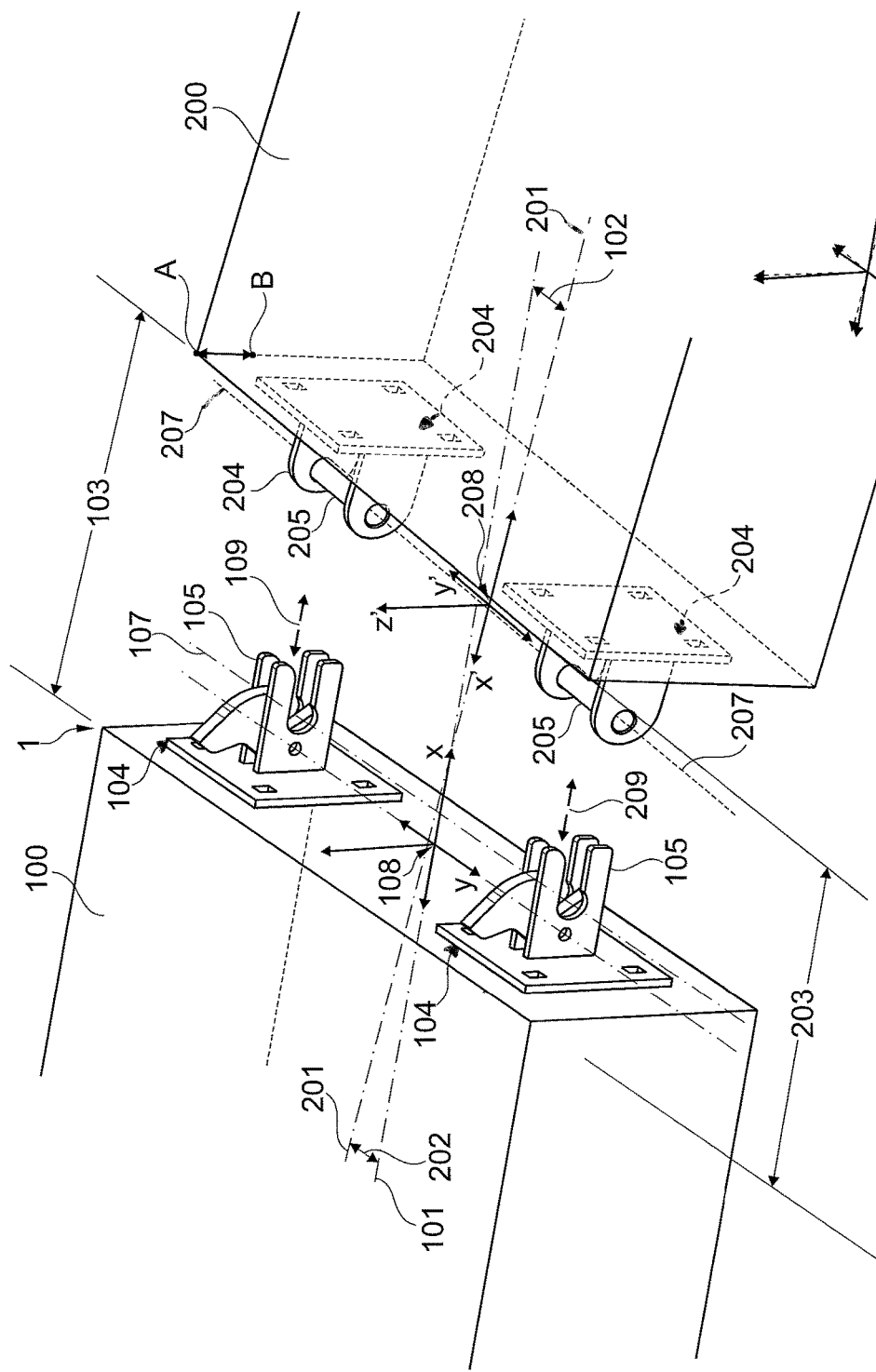
FIG. 1 is a diagrammatic, perspective view of a releasable floating dock hinging latch constructed in accordance with an embodiment of the invention, shown secured to a pair of floating dock sections which are separated and ready for interconnection.

FIG. 1 depicts a pair of floating but heavy dock sections 100 and 200 in outline, both of which are shown as deployed and floating but neither in close proximity nor connected. Dock sections 100 and 200, when secured together, form a multi-part floating dock structure which may be as little as two, or many, individual floating sections each releasably and hingedly joined to an adjacent section or to a retaining wall or access point for relative rotation with the releasable dock latch 1 of the preferred embodiment of the invention.

Releasable dock sections 100 and 200 are separable floating sections with main axes 101 and 201 respectively, as shown in FIG. 1, in fully separated condition and oriented as floating evenly, ready for attachment. A pair of female latch portions 104, each with an elongated female receiver 105, are permanently secured to dock section 100 along a single lateral edge so as to provide a common hinging axis 107. Female latch portions 104 are preferably secured at or near the lateral extremities of dock section 100 along a separable lateral edge and may be as much as 3-6 feet apart or further. Hinging axis 107 is preferably parallel or generally parallel to the surface of the water.

Corresponding male latch portions 204 are similarly permanently secured to adjacent dock section 200 along a corresponding lateral edge thereof so as to provide a corresponding hinging axis 207 for the releasable hinging latch 1 of the preferred embodiment upon latching.

Section 100 is shown in FIG. 1 with a 3-dimensional z-y-x coordinate axis 108 depicted mid-way between female latch portions 104 with the y-axis aligned with hinge axis 107 and the x-axis 101 aligned with a main longitudinal dimension 101 of dock section 100. These axes are shown as horizontal (x and y) and vertical (z) for ease of illustration but this condition is not typical in use.

Corresponding dock section 200 is shown in FIG. 1 with 3-dimensional z'-y'-x' coordinate axes 208 centrally located between male latch portions 204. Axis y' is shown aligned with hinge axis 207 while the x'-axis is aligned with a main longitudinal dimension 201 of dock section 200 with the z'-axis shown as vertical. Axes x'-y'-z' 208 of section 200 are shown as displaced from the corresponding x-y-z axes of section 100 in all 3 dimensions and about all 3 axes to reflect the relative positions of sections 100 and 200 in conditions of actual use. Typically the sections 100 and 200 will be in relative motion with respect to each other at all times and the relative spacings 103 and 203 will be significantly different from side to side.

Each of female latch portions 104 includes a rotatable pawl 110 (FIG. 3) secured for rotational movement about a common axis of rotation 107 (FIG. 3) to a pair of upstanding sidewalls each of which is formed as part of a base plate 116.

Correspondingly each of male latch portions 204 include a base plate 210 (FIG. 6), a pair of upstanding walls 211 and a transversely aligned hinge pin 205. Latch portions 204 are secured to dock section 200 so as to provide a common hinging axis 207 preferably aligned with hinge pins 205.

Figure 2:
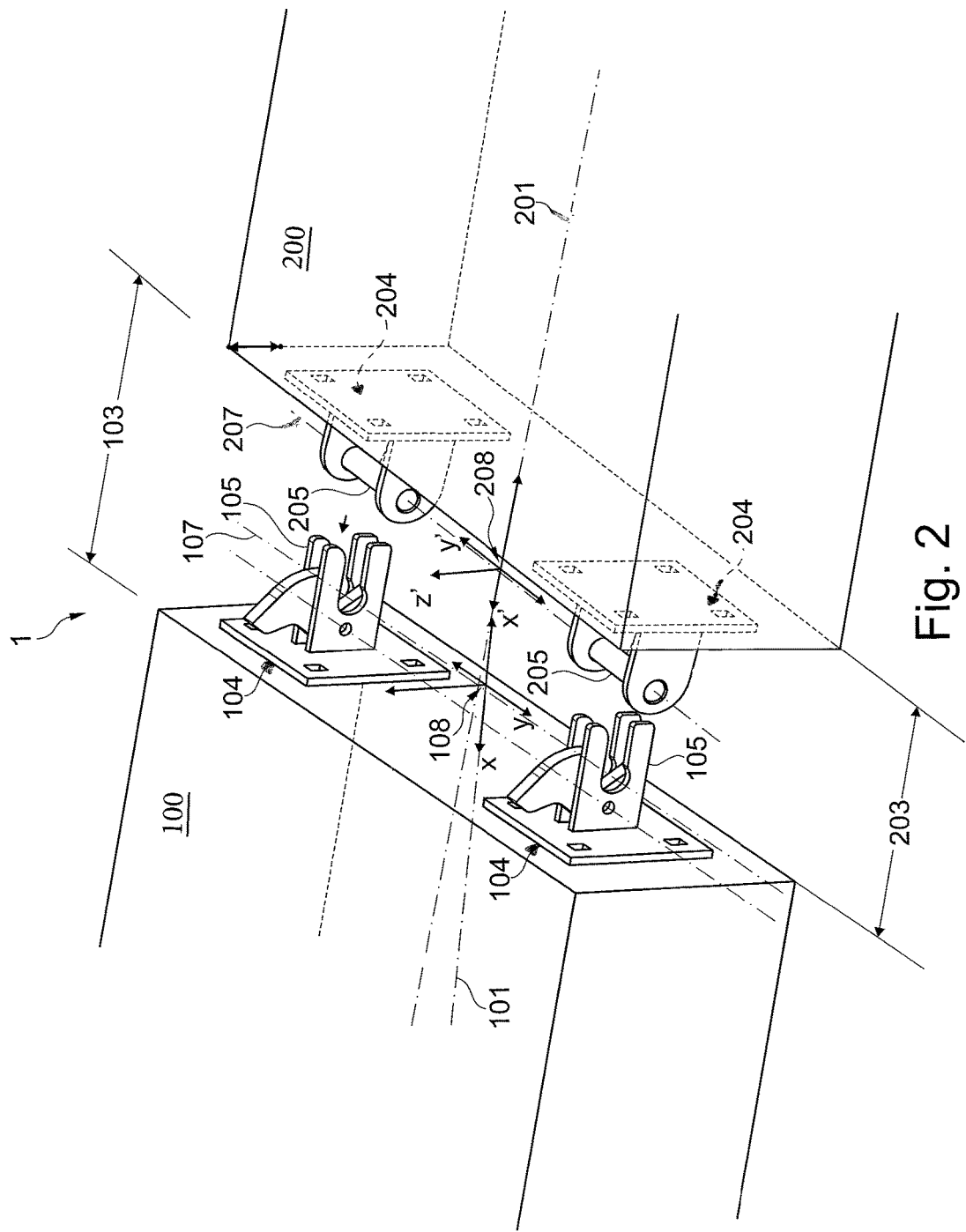
FIG. 2 is a diagrammatic, perspective view of the releasable floating dock hinging latch of FIG. 1, with the floating dock sections having been brought in closer proximity from that shown in FIG. 1.

As a 1st step in the method of the preferred embodiment, dock sections 100 and 200 are preferably manually drawn together so that latch portions 104 and 204 are in closer proximity to one another than is shown in FIG. 1, all as shown in FIG. 2. This drawing together may be accomplished manually by a single person installer in suitable conditions.

In FIG. 2, spacings 103 and 203 are each relatively smaller than these spacings as depicted in FIG. 1 as the releasable hinging latch is being made ready for attachment by the installer. In FIG. 2 the dock sections 100 and 200 remain misaligned about all three axes of motion, as along axes 101 and 201, but are preferably most significantly misaligned relative to the z-axis.

Figure 3:
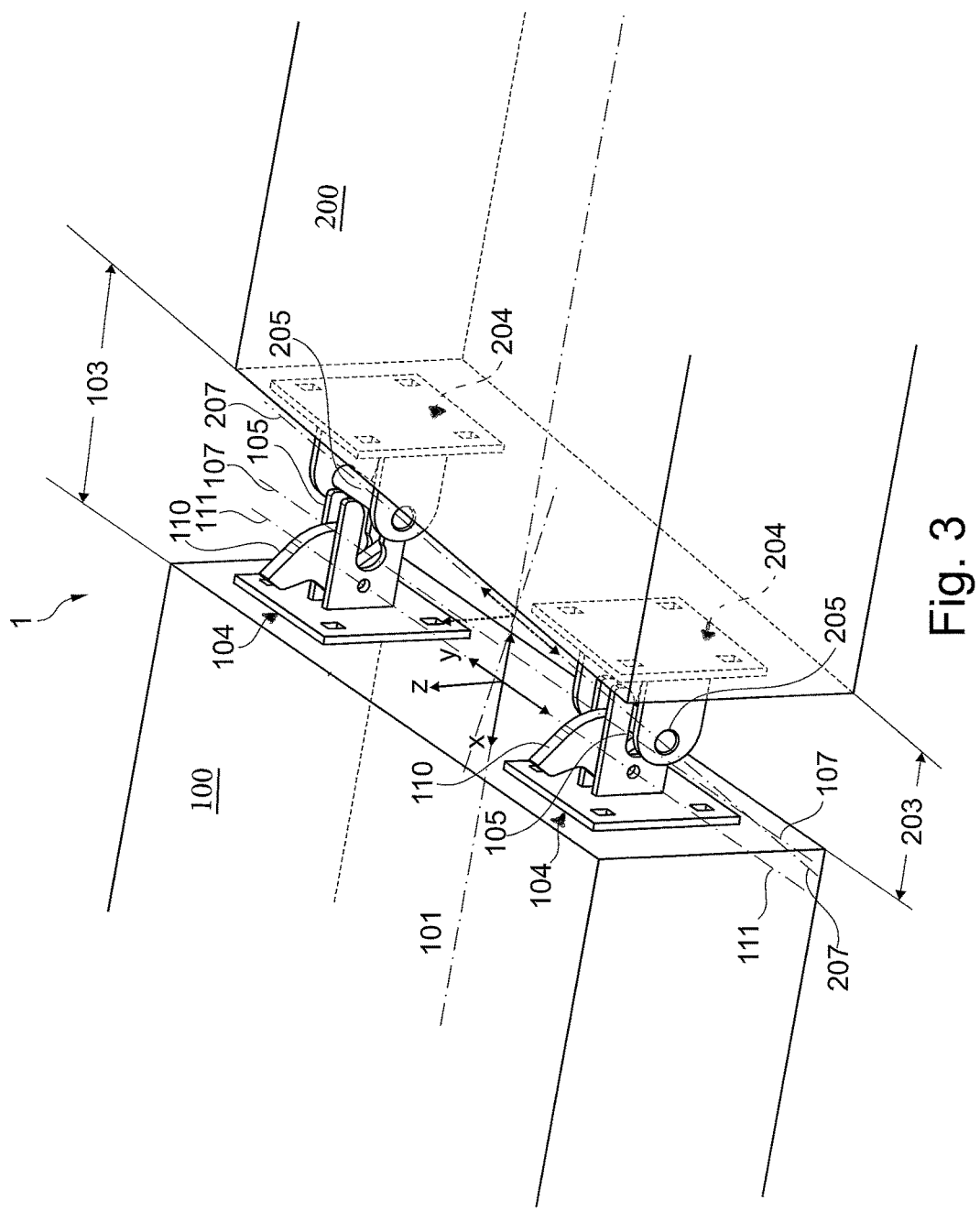
FIG. 3 is a diagrammatic, perspective view of the releasable floating dock hinging latch as shown in FIGS. 1 and 2, with the floating dock sections having been brought in closer proximity from that shown in FIG. 2 and the proximate interconnection underway.

As a 2nd step in the method of the preferred embodiment, dock sections 100 and 200 are moved into an adjacent position for attachment as shown in FIG. 3. Spacings 103 and 203 have been reduced to a minimum and vertical misalignment of the respective horizontal y-axis has been eliminated by manual action upon proximate hinge pin 205 being engaged within proximate female receiver 105 of female latch portion 104.

As the 3rd step in the method of the preferred embodiment, the dock sections as further shown in FIG. 3 are manually moved into a closely adjacent position for attachment of distal hinge portions 104 and 204 by reducing spacing 103 to a minimum and eliminating vertical misalignment of the respective horizontal y-axis upon proximate hinge pin 205 being engaged within proximate female receiver 105 of proximate female latch portion 104.

Figure 4:
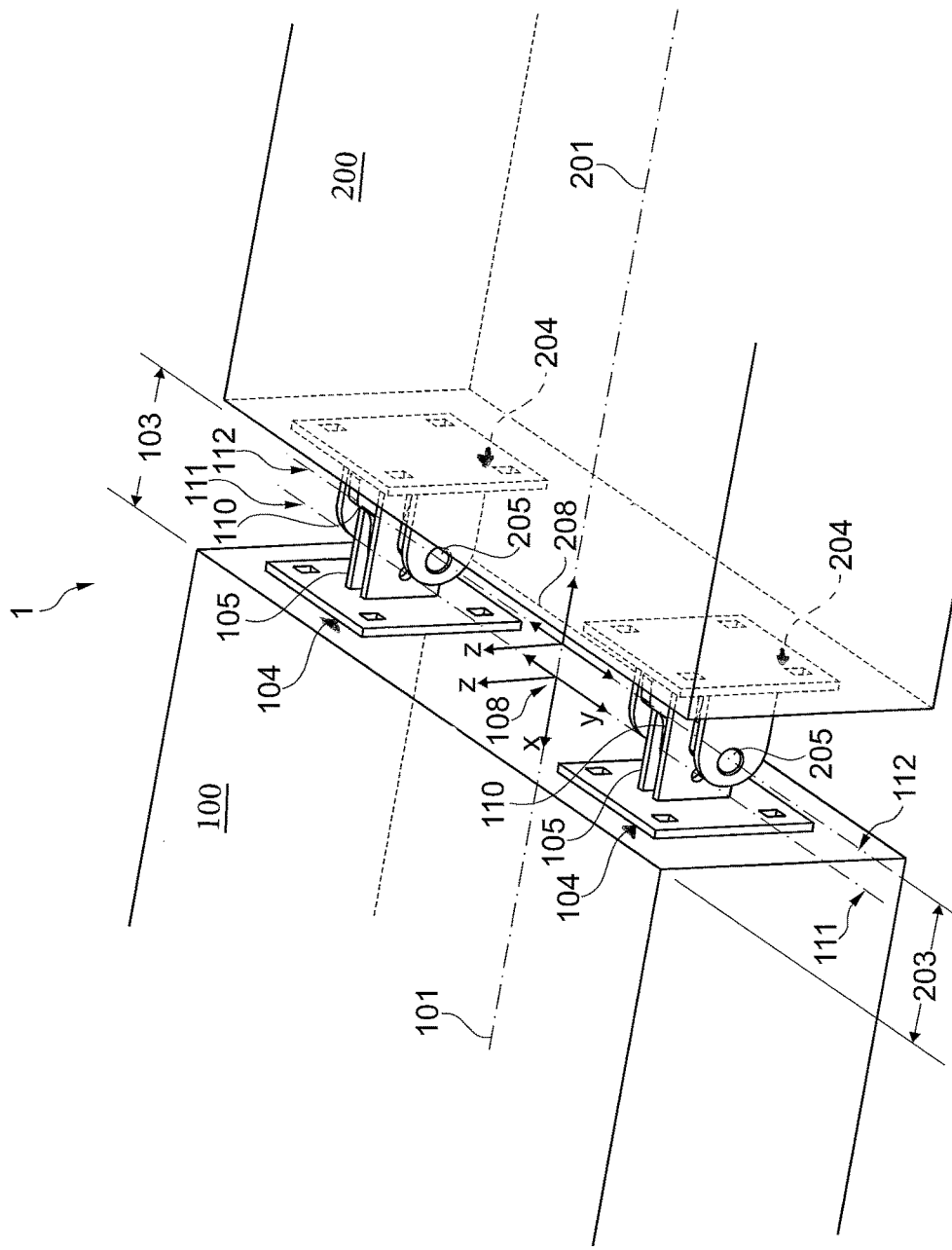
FIG. 4 is a diagrammatic, perspective view of the releasable floating dock hinging latch as shown in FIGS. 1, 2 and 3, with the floating dock sections having been brought into engagement of the releasable floating dock hinging latch of the invention from that shown in FIG. 2.

Completion of the releasable hinging latch of the invention occurs at the 4th step in the method as spacings 103 and 203 are reduced to a minimum and hinging axis 107 is brought fully into alignment with corresponding hinging axis 207 whereupon latch pawls 110, preferably in unison, rotate about axis 111 and capture hinge pins 205. Dock sections 100 and 200 are latched together in alignment vertically and horizontally as shown in FIG. 4 for relative hinging motion about only the horizontal Y-axis.

Figure 5:
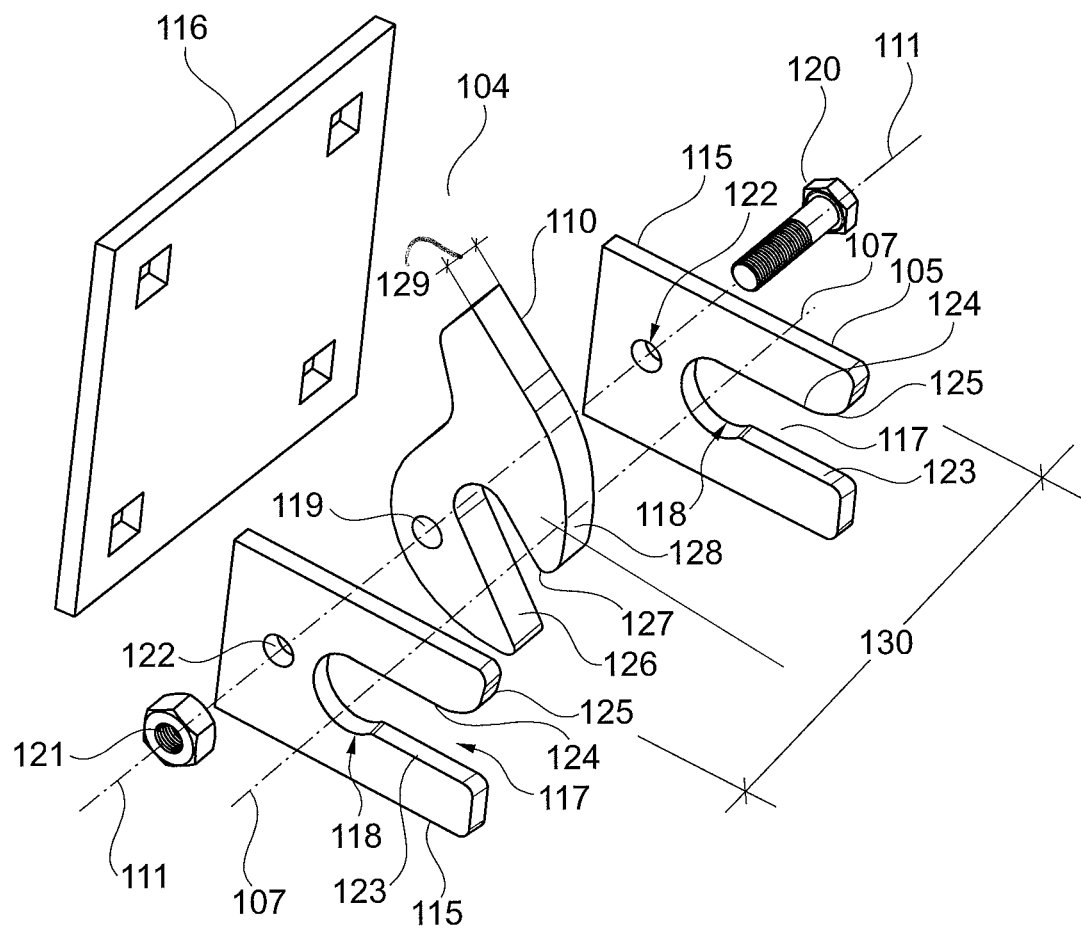
FIG. 5 is an exploded perspective view of a female latch portion of the releasable floating dock hinging latch in accordance with an embodiment of the invention.

FIG. 5 is an exploded view of the female latch portion 104 is shown. Base plate 116 is securely fastened to dock section 100 along a lateral edge as by bolting through apertures in base plate 116. An opposing pair of elongated female receivers 115 are permanently secured as by welding to the face of plate 116 so as to extend primarily along a horizontal x-axis as in FIG. 1 and provide for a second primarily horizontal and hinging y-axis 107 extending along a lateral edge of dock section 100 and nominally parallel to the water surface (not shown).

Receivers 115 each include an elongated channel 117 extending horizontally and nominally along the water surface along x-axis 101.

Further preferably, each of channels 117 include a bulbous internal receptacle 118. Channels 117 are preferably formed into receivers 115 and are aligned horizontally and vertically so as to provide free hinging axis 107 for a corresponding hinge pin 205 similarly secured to dock section 200.

Preferably, pawl 110 is formed of a planar material with a substantial thickness 129 as much as a half-inch, more or less. Pawl 110 is loosely contained at a separation within spaced apart side walls 115.

Figure 6:
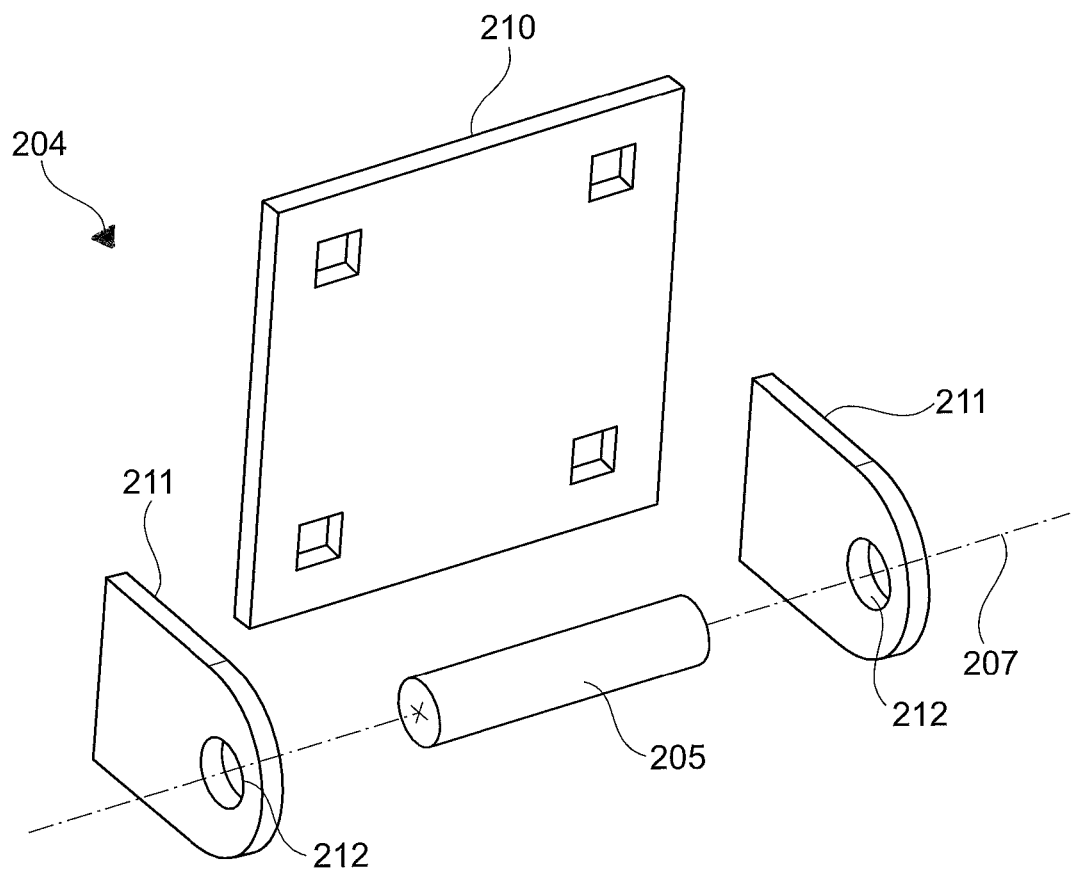
FIG. 6 is an exploded perspective view of a male latch portion of the releasable floating dock hinging latch in accordance with an embodiment.

FIG. 6 is an exploded view of the male latch portion 204 is shown. Base plate 210 is securely fastened to dock section 200 along a lateral edge as by bolting through apertures formed in base plate 210. An opposing pair of extension walls 211 are permanently secured as by welding to the face of plate 210 so as to extend primarily along a horizontal x-axis as at 208 in FIG. 1 and provide for a primarily horizontal and hinging y-axis 207 extending along a lateral edge of dock section 200 and nominally parallel to the water surface (not shown). Walls 211 include a hinge pin 205 therebetween extending horizontally and nominally along the water surface along hinging y-axis 207.

Figure 7:
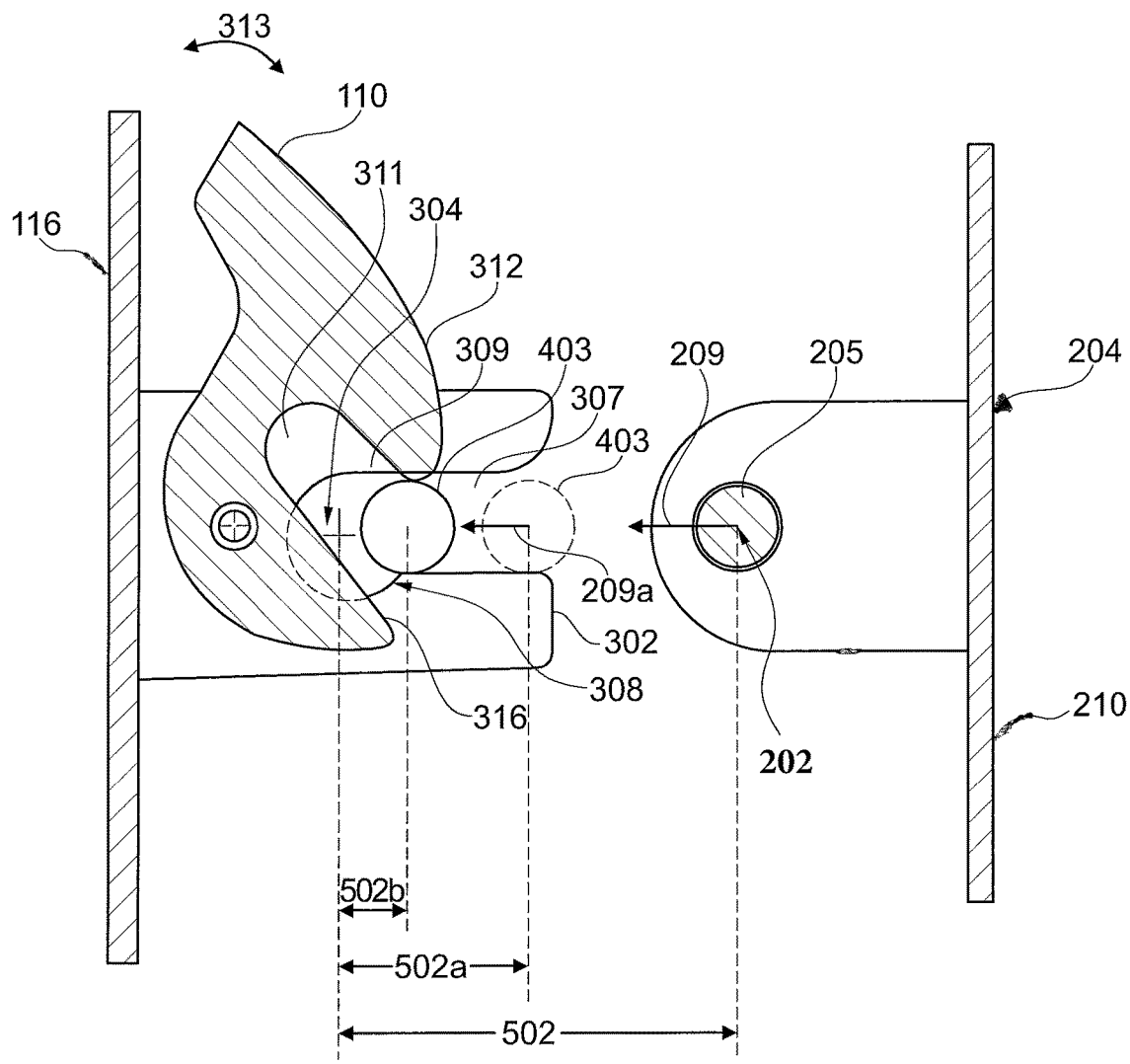
FIG. 7 is a side elevation view of a female latch portion and a male latch portion of the releasable floating dock hinging latch, shown in horizontal and vertical alignment and disengaged from one another.

In FIG. 7 the latch portions 104 and 204 of FIGS. 5 and 6 are shown engaging as per FIGS. 1 to 4 inclusive. FIG. 7 shows the latch portions 104 and 204 in alignment in all 3 dimensions x-y-z so that axes 107 and 207 are parallel and initially spaced apart a distance 502. In accordance with the method of the invention latch portions 104 and 204 are brought closer into engagement along direction 209 and 209a. Initially, pin 205 is brought into initial engagement with receiver channel 307 at a reduced distance 502a.

Latch portions 104 and 204 are further engaged with receiver channel 307 as distance 502 is further reduced as at 502b. As distance 502 is reduced from 502a through 502b pin 205 preferably engages with rotatable pawl 110 along surface 312 and causes rotation of pawl 110 counterclockwise about axis 102 in direction 313 into an upstanding position as shown in FIG. 7.

Most preferably, at distance 502b pin 205 engages with pawl 110 sufficiently to provide a passage for pin 205 within channel 307 beyond pawl nose 315 but not in engagement with bulbous end 308.

Decreasing distance 502 towards zero, that is, full engagement of the latch portions, pin 205 continues in passage 307 into bulbous end 308 wherein it engages with pawl surface 316 driving pawl 110 in a clockwise direction about axis 111. Preferably axes 111 and 207 overlie one another at a distance 502 of zero with pin 205 secured in pawl 110 at catchment 311.

Figure 8:
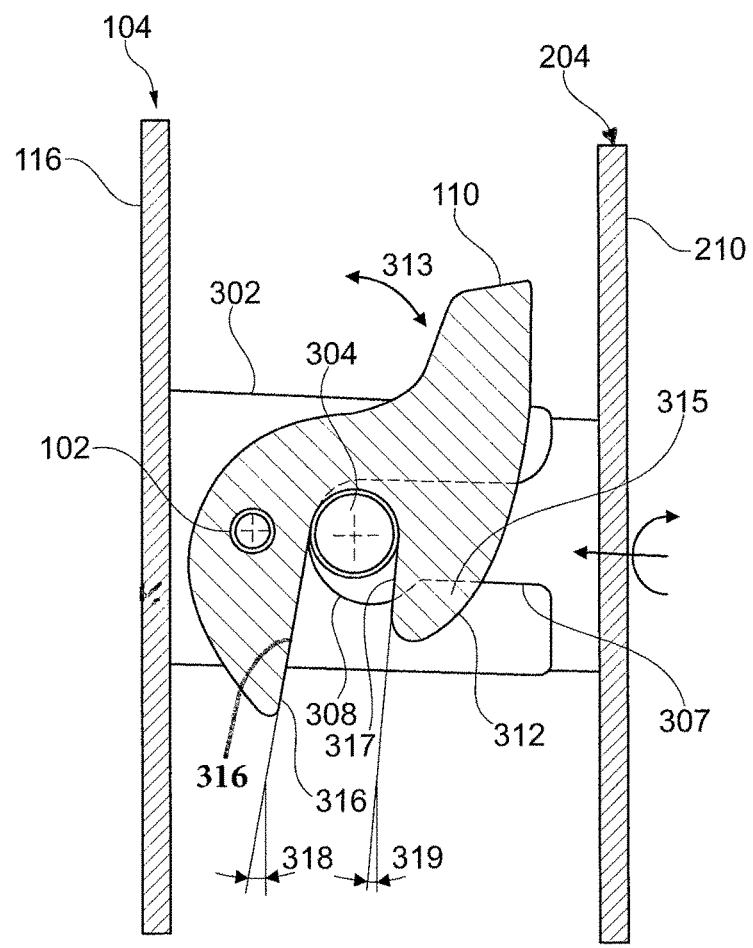
FIG. 8 is a side view of the female and male latch portions of FIG. 7, shown fully engaged.

Full engagement of the latch portions 104 and 204 into the releasable hinging latch of the invention is shown in elevation in FIG. 8. Pawl 110 is fully rotated clockwise about axis 102 so that axes 107 and 207 are aligned in all 3 dimensions. Preferably pawl 110 and pin 205 are slightly over center of axis 102. Additionally, pawl 110 may be fully rotated about axis 102 against stop 318 on back plate 116.

Most preferably, both pawl surface 316 and pawl surface 317 are clockwise over vertical at small angles 318 and 319 respectively. Preferably angle 318 is larger than angle 319 so as to provide an inward taper for catchment 311.

Figure 9:
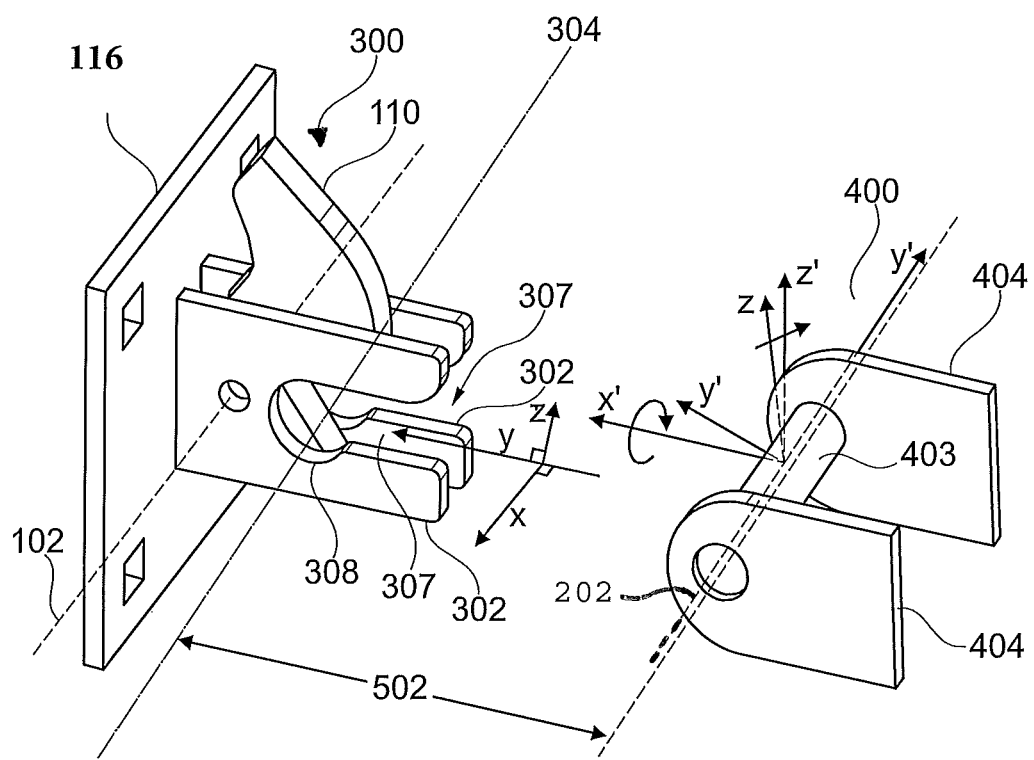
FIG. 9 is a perspective view of the female and male latch portions of FIG. 7, shown disengaged and with rotation of the hinge pin about both the X and Z axes.

In FIG. 9, the releasable hinging latch of the preferred embodiment is shown disengaged and with rotation of hinge pin 403 about both the z and the x axis in relation to the x-y-z axis shown for female latch portion 300. The orientation of latch portion 400 and pin 403 is typical of a floating dock installation where the dock sections start out misaligned as well as disengaged one from the other.

In accordance with the 1st step of the method of the preferred embodiment dock section 200 (not shown in FIGS. 7-9) is manipulated so that proximate male latch portion 204 (FIG. 7) is brought into vertical alignment between both arms 302 of female receiver 307.

In conjunction with the 1st step, dock section 200 is manipulated to rotate about the z-axis (FIG. 9) to bring male latch portion 400 into proximity with female latch portion 300.

In accordance with the 2nd step of the method, the dock sections are further manipulated so as to bring axis 202 into alignment with hinge axis 304 while hinge pins 403 are brought further into female receiver channels 307 (FIG. 9).

In accordance with the 3rd step of the method, the pawls 110 are rotated counter-clockwise so as to permit passage of corresponding hinge pins 403 beyond corresponding pawl tips 315 respectively. In a preferred embodiment, pawls 110 are weighted or biased (FIG. 12) so that they may be tipped up and remain tipped up until the 4th step of the method.

In accordance with the 4th step of the method, shown in FIG. 7, axes 304 and 202 are brought fully into alignment and pawls 110 are driven clockwise substantially in unison by contact between pin 403 and pawl surface 316.

Preferably, hinge pins 403 are captured within respective tapered catchments 311 and float about pawl axis 102 within bulbous end 308 while maintaining surfaces 316 and 317 in contact with pin 403.

Figures 10, 11:
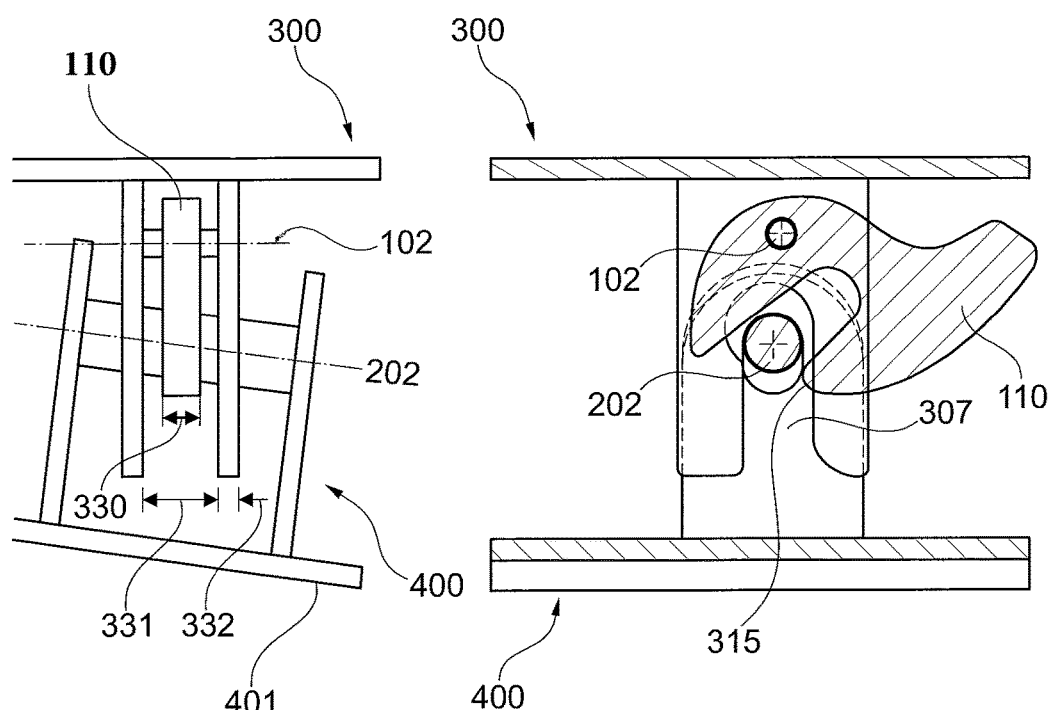
FIG. 10 is a top plan view of a female and male latch portion of the releasable floating dock hinging latch, shown in partial engagement.
FIG. 11 is a side elevation of the female and male latch portions of FIG. 10, shown in partial engagement.

In FIGS. 10 and 11 respectively, a plan view and an elevation of the preferred embodiment of another of the releasable hinging dock latches of the invention. Pawl 110 has a significant width 330 throughout, most preferably about half-inch. Female receivers 307 are spaced apart sufficiently, preferably three-quarter inch, to accommodate non-binding rotation of pawl 110 while engaging hinge pin 403.

Figure 12:
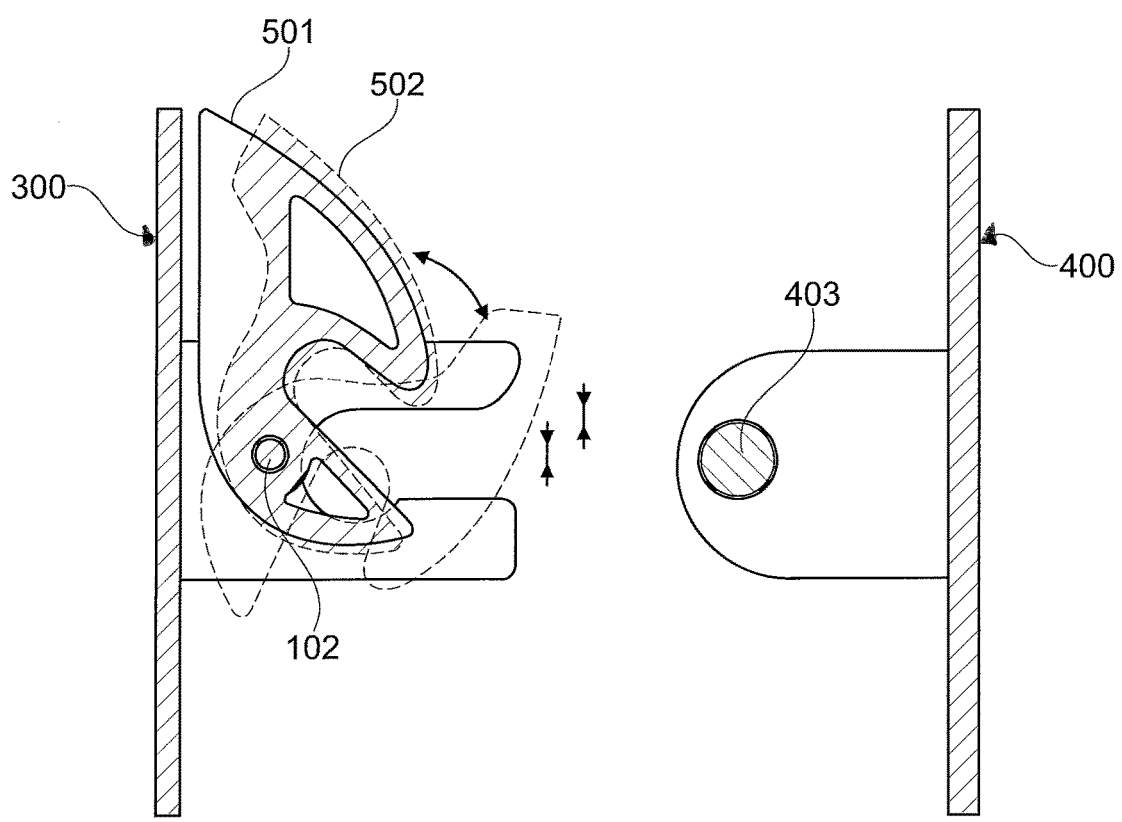
FIG. 12 is a side elevation view of a female latch portion in accordance with another embodiment of the releasable floating dock hinging latch, shown being either weighted or relieved so as to encourage the latch portion to remain in a tipped-up position, ready for engagement with a male latch portion.

As shown in FIG. 11, pawl 110 remains fully rotated counter-clockwise by nose 315 contacting pin 403 or in a preferred embodiment by remaining in a tipped up position, as in FIG. 12, or in the suspended position, shown in FIG. 11, until pin 403 comes into alignment with axis 202, at which point the pawl 110 is permitted to pivot downwards under its own weight into engagement with pin 403 for a secure latchment or driven down by advancement of pin 205 (FIG. 7) against surface 316.

Alternatively, pawl 303 may be enlarged as at 501 or relieved as at 502 in elevation view, as shown in FIG. 12, whereby pawl 110 may remain more securely, fully rotated, or tipped up under its own weight until engagement occurs.

As will be seen by persons skilled in the art, the releasable floating dock hinging latch of the invention is not limited to those embodiments described.

What is claimed is:

1. A floating dock hinging latch for releasably interconnecting a pair of floating dock sections in an adjoined spaced relation for relative hinging motion, the floating dock hinging latch comprising:
    first and second female latch portions secured to a lateral
        side of a first dock section in a horizontally spaced relationship, each of said first and second female latch portions comprising a channel extending in a direction perpendicularly outwardly from said lateral side of said first dock section;

first and second male latch portions secured to a lateral side of a second dock section in a horizontally spaced relationship, each of said first and second male latch portions having a horizontally oriented hinge pin extending generally parallel to said lateral side of said second dock section;

wherein said first female latch portion is hingedly engaged with said first male latch portion by said hinge pin of said first male latch portion extending through said channel of said first female latch portion;

wherein said second female latch portion is hingedly engaged with said second male latch portion by said hinge pin of said second male latch portion extending through said channel of said second female latch portion; and wherein each of said first and second female latch portions further includes a rotatable pawl, said rotatable pawl of said first female latch portion releasably retaining said hinge pin of said first male latch portion within said channel of said first female latch portion, and said rotatable pawl of said second female latch portion releasably retaining said hinge pin of said second male latch portion with said channel of said second female latch portion.

2. The floating dock hinging latch of claim 1, wherein said pawl of each of said first and second female latch portions is shaped so as to have a tendency to remain in a first rotated non-engaged position under its own weight.

3. The floating dock hinging latch of claim 1, wherein:
said channel of each of said first and second female latch portions has a bulbous receptacle; and
wherein said hinge pin of said first male latch portion is received by said bulbous receptacle of said channel of said first female latch portion and said hinge pin of said second latch portion is received by said bulbous receptacle of said channel of said second female latch portion.

4. The floating dock hinging latch of claim 1, wherein each of said first and second female latch portions further comprise:
a base plate;
a pair of elongated female receivers secured to said base plate in a horizontally spaced relation thereby defining a space therebetween; and
and wherein said elongated female receivers define said channel.

5. The floating dock hinging latch of claim 4, wherein each of said first and second female latch portions further comprises a rotatable pawl disposed within said space.

6. The floating dock hinging latch of claim 1, wherein each of said first and second male latch portion further comprise:
a base plate;
a pair of extension walls secured to said base plate in a horizontally spaced relationship; and
wherein said hinge pin is connected to and extends between said pair of extension walls.

7. The floating dock hinging latch of claim 1, wherein said first and second female latch portions are operatively engaged with said first and said second male latch portions, respectively, by moving said lateral sides of said first and said dock sections toward one another.

8. A floating dock assembly comprising:
first and second floating dock sections hingedly and releasably connected to one another along adjoining, spaced, lateral and parallel extending sides of said dock sections by a floating dock hinging latch;
said floating dock hinging latch comprising:
first and second female latch portions secured to a lateral side of said first dock section in a horizontally spaced relationship, each of said first and second female latch portions comprising a channel extending in a direction perpendicularly outwardly from said lateral side of said first dock section;
first and second male latch portions secured to a lateral side of said second dock section in a horizontally spaced relationship, each of said first and second male latch portions having a horizontally oriented hinge pin extending generally parallel to said lateral side of said second dock section;
wherein said first female latch portion is hingedly engaged with said first male latch portion by said hinge pin of said first male latch portion extending through said channel of said first female latch portion;
wherein said second female latch portion is hingedly engaged with said second male latch portion by said hinge pin of said second male latch portion extending through said channel of said second female latch portion; and
wherein each of said first and second female latch portions further includes a rotatable pawl, said rotatable pawl of said first female latch portion releasably retaining said hinge pin of said first male latch portion within said channel of said first female latch portion, and said rotatable pawl of said second female latch portion releasably retaining said hinge pin of said second male latch portion with said channel of said second female latch portion.

9. The floating dock assembly of claim 8, wherein said pawl of each of said first and second female latch portions is shaped so as to have a tendency to remain in a first rotated non-engaged position under its own weight.

10. The floating dock assembly of claim 8, wherein:
said channel of each of said first and second female latch portions has a bulbous receptacle; and
wherein said hinge pin of said first male latch portion is received by said bulbous receptacle of said channel of said first female latch portion and said hinge pin of said second latch portion is received by said bulbous receptacle of said channel of said second female latch portion.

11. The floating dock assembly of claim 8, wherein each of said first and said second female latch portions further comprise:
a base plate;
a pair of elongated female receivers secured to said base plate in a horizontally spaced relation thereby defining a space therebetween; and
and wherein said elongated female receivers define said channel.

12. The floating dock hinging latch of claim 11, wherein each of said first and second female latch portions further comprises a rotatable pawl disposed within said space.

13. The floating dock hinging latch of claim 8, wherein each of said first and second male latch portion further comprise:
a base plate;
a pair of extension walls secured to said base plate in a horizontally spaced relationship; and wherein said hinge pin is connected to and extends between said pair of extension walls.

14. The floating dock hinging latch of claim 8, wherein said first and said second female latch portions are operatively engaged with said first and said second male latch portions, respectively, by moving said lateral sides of said first and said second dock sections toward one another.

15. A method of hingedly connecting together two floating dock sections, the method comprising the steps:
   a) providing a floating dock hinging latch comprising:
      first and second female latch portions, each of said first and second female latch portions having a female latch base plate and a channel extending in a direction perpendicularly outwardly from said female latch base plate;
      first and second male latch portions, each of said first and second male latch portions having male latch base plate and a hinge pin connected to said male latch base plate;
   b) fastening said female latch base plate of each of said first and second female latch portions to a common lateral side of a first dock section such that said first and second female latch portions are in a horizontally spaced relationship along said lateral side of said first dock section;
   c) fastening said male latch base plate of each of said first and second male latch portions to a common lateral side of a second dock section such that said first and second male latch portions are in a horizontally spaced relationship along said lateral side of said first dock section and such that each hinge pin is horizontally oriented and generally parallel to said lateral side of said second dock section;
   d) moving one or more of said first and second dock sections to bring said lateral sides of said first and second dock sections together;
   e) engaging said hinge pin of said first male latch portion with said channel of said first female latch portion, and engaging said hinge pin of said second male latch portion with said channel of said second female latch portion; and
   f) releasably retaining said hinge pin of said first male latch portion in engagement with said channel of said first female hinge portion, and releasably retaining said hinge pin of said second male latch portion in engagement with said channel of said second female latch portion.

\* \* \* \* \*